Jan. 25, 1966          A. E. SIEGMAN          3,231,742
FREQUENCY MODULATION OPTICAL RECEIVER SYSTEM
Filed Nov. 14, 1962          2 Sheets-Sheet 1
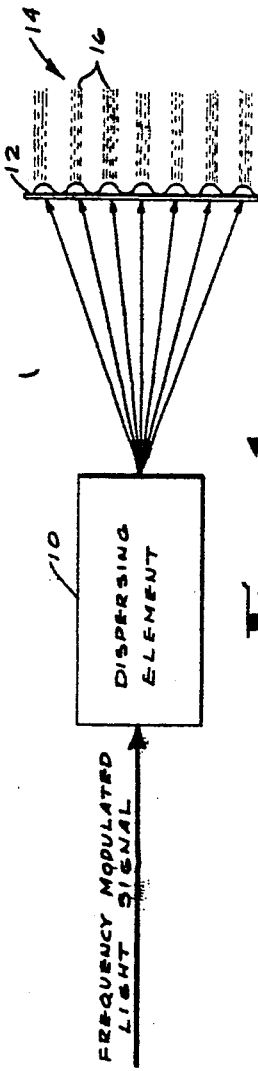
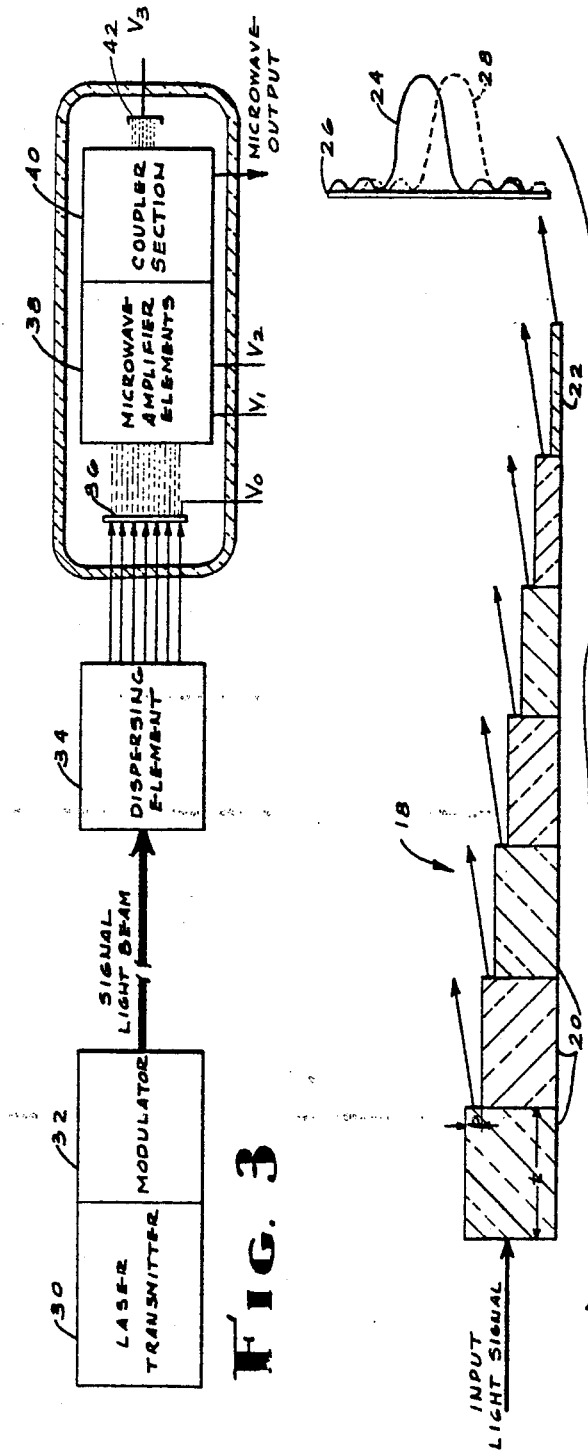
ANTHONY E. SIEGMAN
INVENTOR.
BY Daniel T. Anderson
Nilsson & Robbins
ATTORNEYS.

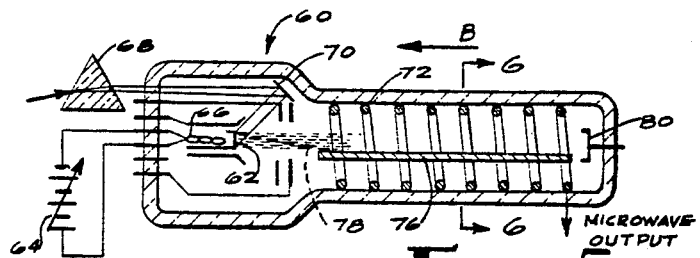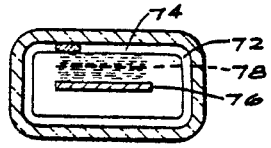
FIG. 5    FIG. 6
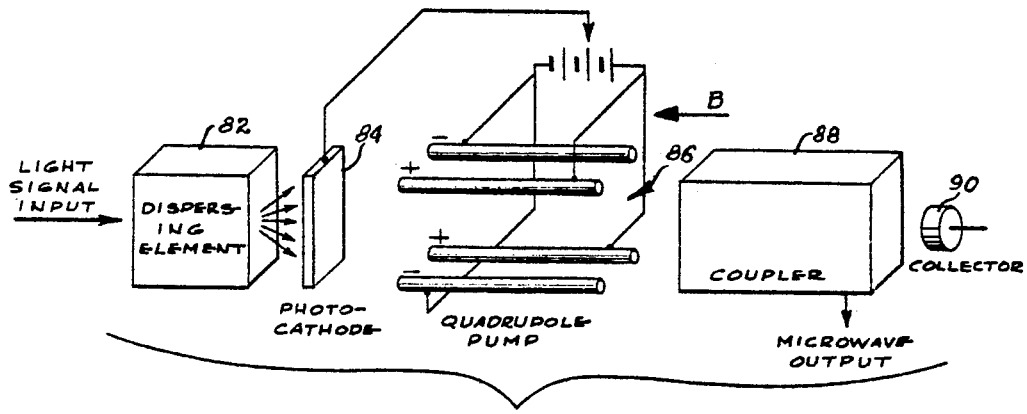
FIG. 7
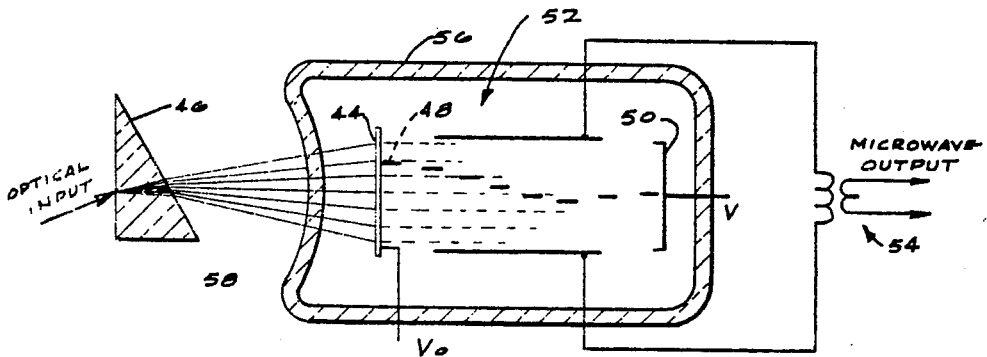
FIG. 4
ANTHONY E. SIEGMAN
INVENTOR.

United States Patent Office 3,231,742
Patented Jan. 25, 1966

3,231,742
FREQUENCY MODULATION OPTICAL RECEIVER SYSTEM
Anthony E. Siegman, 454 Tennessee Lane, Palo Alto, Calif.
Filed Nov. 14, 1962, Ser. No. 237,486
8 Claims. (Cl. 250—199)

This invention relates generally to light signal systems and more particularly to receivers for detecting and demodulating frequency modulated coherent light signals.

With the rapid development in recent years of lasers, or optical masers, there has been provided a useful source of coherent, monochromatic radiation in the infrared, visible and ultraviolet regions of the electromagnetic wave spectrum hereinafter referred to as "light" or "optical regions." The achievements involved in this development have made a vast region of the spectrum available for a multitude of uses which previously were practicable, if at all, only at "radio" frequencies. In the general field of communications, for example, these achievements provide not only an extremely large number of new "channels" for carrying information but also permit more information per channel because higher modulation frequencies can be utilized. In addition there are many other advantageous ramifications of the capability to generate and amplify monochromatic coherent light signals.

However, many desired utilizations of the vast optical spectrum require that an optical carrier signal be modulated as for example by pulses for radar-like applications or amplitude or angular modulation as for such uses as communications, metrology, or the like. In this regard it is elementary that as indicated above the higher the modulation frequencies the greater the total amount of information that can be carried by the carrier wave. Accordingly it is highly desirable to modulate the light beam with extremely high frequencies such as radio frequencies in the microwave range.

A number of modulation techniques have been proposed and demonstrated. For example a liquid Kerr cell and the solid state Pockels cell have been shown to be useful in this connection. Of these the Pockels cell is of particular importance and modulation is possible to at least the order of 25 kilomegacycles and to modulation powers of the order of a kilowatt for 100% amplitude modulation with X-band modulation. The basic effect employed in the Pockels cell is an electrically induced birefringence in a crystal such as potassium dihydrogen phosphate. This technique produces directly an angular modulation of the light by virtue of its polarization orientation with respect to orthogonal axes in the crystal. By combining appropriate polarizers and quarter wave plates this phase or frequency modulation can be converted, when desired, to amplitude modulation.

The present invention as indicated above is concerned primarily with demodulation of the light beam which has been modulated at a presumably, but not necessarily, microwave frequency by any desired technique; and most of the following examples and discussion will be directed thereto without particular regard to how or where the light beam was generated or modulated.

A number of amplitude demodulation methods and devices have been proposed or developed. Among these are solid state photodiodes, photomultiplier vacuum tubes, and, most recently, microwave phototube detectors and amplifiers.

In the case of the solid state semiconductor photodiodes either a PIN structure or a varactor diode structure with high back bias is employed by exposing the diode structure to the intelligence-carrying light waves. The transit time across the intrinsic region or depletion layer in such devices can be very short, thusly permitting photo detection of modulation frequencies into the lower microwave region. However, even though such photodiodes may be made to be simple, rugged, and dependable and may exhibit relatively high quantum efficiencies and sensitivities, even in the infrared region, their design for use in such demodulation applications requires a serious compromise between obtaining small junction capacitance, large sensitive area, and low transit time. Moreover their maximum bandwidths are small and they have no built-in amplification; that is, no capability for amplifying the detected signal.

The conventional photomultiplier tube does, on the other hand, contain a capability for built-in amplification; and its amplification and sensitivity may be relatively high. However, reduction of the electron transit time spread to permit operation of the electron multiplier for detecting and amplifying modulation in the microwave region is a severe problem not yet satisfactorily solved. Similarly an output coupling technique for photomultipliers which is satisfactory at microwave frequencies has not yet been developed. Further disadvantages of the photomultipliers are that they typically require relatively elaborate and bulky power supplies and that the higher gain types are susceptible to burnout under slight overload conditions. In this latter regard it should be noted that the amplifier mechanism amplifies both the direct and the fluctuating currents in the tube and that therefore when a strong "local oscillator" laser is used as in a heterodyne mode a direct current component is created which tends particularly quickly to cause burnout of the sensitive electron multiplier.

An example of the microwave phototube mentioned above comprises a traveling wave tube microwave amplifier utilizing a photosensitive cathode. The modulated light signal is then impressed upon the cathode and its intensity modulation causes the photo current emitted from the cathode to be current-modulated in accordance with the modulation on the received signal. This initial current modulation excites the well known space charge waves in the electron stream, and the traveling wave tube slow wave structure may then amplify them to any desired degree. A heterodyne version may be provided by impressing a local oscillator laser beam upon the photosensitive cathode at the same time and at the same angle of incidence as the signal light wave. In this event the square law detection charactteristic of the photosensitive cathode is utilized as a mixer so that the initial correct modulation on the stream is at an intermediate frequency.

Such microwave phototubes appear to hold considerable promise as widely useful receiver systems. Their many advantages include operation at microwave frequencies and built-in amplification.

It is an object of the present invention to provide a receiver system for detecting freqeuncy-modulated light signals.

It is another object to provide a light signal demodulator for signals which are frequency-modulated at microwave frequencies.

It is another object to provide such a light signal demodulator which is very broad band.

It is another object of the invention to provide a receiver system for frequency-modulated light signals modulated at microwave frequencies and which provides built-in amplification for the demodulated microwave signal.

It is another object to provide an integral frequency modulation optical wave detector and microwave amplifier tube.

Briefly, in accordance with one example of an embodiment of the invention, these and other objects are achieved in a phototube detector and microwave amplifier tube combination which includes an electron gun having a photosensitive cathode. The electron gun and the microwave amplifying elements are immersed in a longitudinal magnetic field for constraining the electron stream and supporting cyclotron waves therein. An optical system including a dispersion element such as a glass prism is provided for directing a microwave frequency modulated beam of light onto the photoemissive surface of the cathode.

The optical frequency modulation is converted into space modulation by the optical dispersing element which effectively spreads the light energy over the surface of the photocathode in a pattern representative of the frequency components of the modulated light signal. The pattern is reproduced in the emitted photocurrent beam whereby the profile of electron intensity across the width of the beam includes the information of the frequency makeup of the incident light signal.

As the frequency composition of the light signal changes, in accordance with this modulation, the electron intensity profile changes; for example, its center of gravity will shift from side to side.

This transverse-shifting of the beam intensity profile at the plane of electron emission causes transverse waves at the modulation frequency to be established on the electron beam; that is, the so-called synchronous cyclotron waves are excited. This transverse wave excitation is then amplified and detected, in this example, by a quadrupole parametric pump followed by a transverse wave electron stream coupler which removes the stream modulation as a microwave signal, the amplitude characteristics of which duplicate the frequency modulation on the incident light signal.

Further description of these and other novel features of the invention and its principles of operation and of additional examples thereof will be presented below in connection with a discussion of the accompanying drawings, presented by way of example only and in which:

FIG. 1 is a schematic diagram illustrating a principle of operation of the present invention;

FIG. 2 is a schematic diagram illustrating a particular example of a dispersing element utilized in accordance with the principles of the present invention;

FIG. 3 is a schematic diagram of a practical embodiment of an optical communications system constructed in accordance with the present invention;

FIG. 4 is a schematic view of a frequency-modulated light signal receiver system constructed in accordance with the present invention;

FIG. 5 is a longitudinal sectional view shown partially schematically of a light signal frequency discriminator and traveling wave tube amplifier;

FIG. 6 is a cross-sectional view of the structure of FIG. 5 taken along the lines 6—6 thereof; and FIG. 7 is a schematic view of a beam parametric amplifier example of the present invention.

In the figures it is stressed that the details shown are presented in the cause of providing what is believed to be the most useful and readily understood description of the principles of the invention. The scope of the invention is defined by the appended claims forming a part of this specification and is not intended to be limited by the particular details of the specification and drawings which are presented by way of example only.

Referring to FIG. 1 a dispersing element 10 is illustrated schematically as being optically coupled to a semi-transparent photocathode 12. Examples of types of dispersing elements suitable for use in the practice of the present invention will be discussed below. It suffices here to point out merely that the frequency modulated light signal which may be received from a distant laser transmitter is impressed upon the optical input of the dispersing element. The latter, in turn, disperses each different sideband or spectral component to a different angle so that a pattern of light intensity is impressed upon the photoemissive surface of the cathode 12 corresponding to the frequency composition of the modulated light signal. Since each increment of the photocathode emits an intensity of electrons proportional to the intensity of light incident thereupon, a resulting beam 14 of electrons may be emitted which has an intensity profile taken along the width of the photocathode 12 which corresponds to the pattern of light intensity impressed upon the cathode from the dispersing element 10. In this manner the frequency modulated light is converted by the dispersing element into space modulated light which is in turn impressed upon a photocathode where it becomes the source of a stream of electrons, the intensity profile of which contains information concerning the instantaneous frequency composition of the received light signal. In other words each of the dispersed light rays corresponds to an optical frequency differing by the modulation frequency from the optical frequency of adjacent rays. Moreover each spectral component, and hence the current in each electron beamlet 16 has constant intensity in time since the cathode does not follow variations at optical frequencies.

It should be noted that all the light rays or light spots overlap on the photocathode surface to at least some extent because of the finite resolving power of the dispersing element. As a result of the inevitable overlap there is some photomixing or beating between all of the spectral components at all points on the photocathode. As a result the electron emission at each point on the photocathode contains at least some component at the modulation frequency and also at harmonics of this frequency. The total effect is that the center of gravity of all the beamlets, that is of the total photoemitted current, moves back and forth transversely at the modulation frequency rate. In principle it remains only, for the completion of the demodulation function, to combine the structure with transverse microwave tube elements which respond to the center of gravity motion of the total electron stream.

For purposes of maximizing the transverse motion of the center of gravity of the beam current in a given utilization, it is desirable to make the distance on the photocathode between adjacent side band spectral components as large as possible while at the same time causing the individual spectral components to overlap each other considerably. In optical terminology, an instrument having high dispersion and low resolution is preferred. In FIG. 2 a dispersing element 18 known as a Michelson transmission echelon is illustrated as consisting of a stack or staircase of staggered glass plates 20 in the direction of the input light signal. Succeeding glass plates decrease in height by an amount $b$ until a final plate 22 is reached which has a total height of $b$. Each of the plates has a thickness in the direction of the input light signal of $t$ which is a constant for all of the plates.

In operation a spectral component of the input light signal is propagated through the echelon and forms an interference pattern 24 on the photoemissive surface of a photocathode 26. A corresponding beam of electron current is emitted in response to the interference pattern. A different spectral component of the input light signal may be transmitted through the dispersing element 18 and form a different interference pattern 28 on the photoemissive surface of the cathode 26. Again the center of gravity of the separate beamlets will move transversely back and forth across the width of the cathode 26 as the Fourier makeup of the input light signal changes.

In such a Michelson echelon the dispersion is determined by the step height $b$, the plate thickness $t$, and the index of refraction of the plates 20 and 22. The resolution is determined by the number of plates. In a practical example for a receiver system for a carrier wave length of 6943 angstroms and a modulation frequency of 3,000 megacycles/second the echelon step height $b$ was one millimeter and the echelon plate thickness $t$ was ten millimeters. The number of plates within the incident light beam was 4.

In FIG. 3 an example of a broadband optical communication system is illustrated including a laser, or optical maser, 30, which may for example be a solid state ruby rod type. Its optical carrier wave output is angular modulated by a modulator 32 which may be a solid state Pockels cell as described above. As also mentioned earlier the Pockels cell or liquid Kerr cell is basically an angular modulator and is capable of providing pure phase or frequency modulation of an optical signal at a microwave modulation frequency with no energy loss suffered by the optical carrier.

The frequency modulated signal from the transmitter 30 is directed upon the optical input of a dispersing element 34 which in turn disperses the individual frequency components in a spectral pattern across the width of the reverse side of a semi-transparent photocathode 36. The operation of the cathode is the same as that discussed above in connection with the description of FIG. 1. The transverse motion of the center of gravity of the composite electron stream from the cathode 36 causes the excitation of transverse waves. The electron stream thusly containing the spectral information of the received signal light beam is impressed upon microwave amplifier elements 38 which may be any of several transverse wave amplifier systems well known in the microwave electron tube art. After the transverse wave is pumped, or amplified, its energy is extracted from the stream by a coupler section 40 which may be any well known transverse field coupler such as the Cuccia type to be shown in more detail below. The demodulated electron stream is then collected at a collector 42 and returned to the system power supply, not shown.

The electronic components of the system may be enclosed in a transparent vacuum envelope 44 and be provided with appropriate operating voltages $V_0$, $V_1$, $V_2$, and $V_3$ as indicated.

It is to be noted that in many utilizations of the invention, active amplification of the demodulated signal is not required. In FIG. 4 such a utilization is illustrated. A frequency modulated light signal input is dispersed into a spectral pattern on a photocathode 44 by a triangular optical prism 46 having its length disposed perpendicularly to the path of the input light signal. The transverse motion of the center of gravity of the resultant electron stream is indicated by the dotted line 48. The stream is collected at the output end of the tube by a collector electrode 50. A pair of plates 52 which form the capacitive portion of a tuned Cuccia coupler are disposed contiguously to the electron stream between the cathode 44 and the collector electrode 50. In this example the coupler removes the signal from the stream and couples it to a microwave output terminal 54. Again appropriate direct current potentials $V_0$ and $V$ are applied to the cathode and collector electrode. An envelope 56 having at least a transparent end portion 58, for the transmission of the optical input signal, is provided about the environment of the electron stream and the electronic components associated therewith.

Referring to FIG. 5 and FIG. 6 an example of the invention embodying a flattened helix transverse coupler which is capable of transverse coupling as well as synchronous wave amplification when desired is shown. In this example a traveling wave tube electron gun 60 is provided having a cathode 62 which is both thermionically as well as photo emissive. A variable source of potential 64 is coupled to the cathode heater 66 so that a quiescent electron beam current can be supplied when useful for achieving an optimum degree of electromagnetic interaction between the slow wave circuit and the electron stream.

An input frequency modulated optical signal is directed through a prism dispersion element 68 and thence upon the photoemissive surface of the cathode 62. A mirror 70 may be interposed as shown to direct the dispersed light rays on the cathode in the illustrated end fire arrangement. As is evident the optical signal may alternatively be impressed directly upon the cathode without the mirror 70 when the end fire arrangement is not particularly advantageous.

The emitted electron stream is projected to the right, as viewed in FIG. 5, through the flattened helix 72 between its upper portions 74 and a center conductor 76, that is, through a region of suitable transverse interaction fields. The slow wave circuit and electron gun are immersed in a longitudinal magnetic field environment as indicated at B. This magnetic field B may be established and maintained by conventional means, not shown, such as a solenoid or permanent magnet. The dotted line 78 indicates the center of gravity of the stream as it traverses the structure toward a collector electrode 80. The slow-wave structure comprising the flattened helix 72 and the center conductor 76 all immersed in the longitudinal magnetic field B are clearly of the character to achieve electromagnetic energy exchange relationship with the transverse, synchronous cyclotron waves on the off-center electron stream.

In FIG. 7 an electron beam parametric amplifier example of the invention is illustrated. As in the above examples a dispersing element 82 is shown optically coupled to a photocathode 84. The resulting stream of electrons is directed along the axis of a direct current energized quadrupole section 86. The transverse "motion" of the electron stream is converted to cyclotron motion and parametrically pumped by the non-angularly symmetric quadrupole field and an environmental longitudinal magnetic field B. The amplified transverse synchronous cyclotron wave is then removed from the stream by a transverse field coupler 88 and the demodulated stream collected by a collector electrode 90.

There has thus been disclosed a frequency modulated light signal receiver system which achieves the objects and exhibits the advantages enumerated above.

What is claimed is:

1. A frequency modulated light signal receiver system for demodulating signals in a received beam having frequency components in a predetermined range, said system comprising: a photoemissive cathode for emitting a stream of electrons along a predetermined direction and having an emissive surface with a width dimension transverse to said predetermined direction; an optical dispersing element interposed in the path of said received beam and optically coupled to said cathode, said element being of the character and being disposed to impress said frequency components of said received beam upon said emissive surface at predetermined displacements along said width dimension corresponding to the magnitude of frequency of each of said components and thereby spacially modulating said stream with different intensities at different positions along the direction of said width dimension; and transverse wave beam coupling means disposed in electromagnetic microwave interaction relationship with said electron stream for demodulating said electron stream.

2. A frequency discriminator optical receiver for demodulating a frequency modulated coherent light wave signal comprising: a microwave amplifier tube including transverse wave microwave coupling and amplifier means for amplifying transversely induced microwave electron stream waves and an electron gun having a photosensitive cathode for directing an electron stream contiguously to the said amplifier means along a predetermined path, said cathode having a photosensitive surface disposed substantially transversely to said predetermined path and having a predetermined width in the transverse direction; and means for impressing said coherent frequency modulated light signal upon said photosensitive surface of said cathode including a light beam dispersion means for directing the frequency components of said light wave signal upon said photosensitive surface with a transverse light intensity pattern in said transverse direction whereby said pattern is representative of the frequency composition of said frequency modulated light signal wave, said electron stream thereby having an initial intensity profile corresponding to said pattern.

3. A frequency modulated light signal receiver system comprising: a microwave amplifier electron tube including an electron gun having a photocathode for directing an electron stream along a predetermined direction and having transverse wave microwave coupler amplifier elements disposed in electromagnetic microwave interaction relationship with said electron stream for amplifying transverse synchronous waves in said electron stream, said photocathode having a photoemissive surface with a width dimension transverse to said predetermined direction; a Michelson echelon dispersion element optically coupled to said photoemissive surface and interposed in the path of the incident light signal for impressing at least a first order of the interference pattern therefrom upon said photoemissive surface.

4. A traveling wave tube frequency modulation optical receiver comprising: a transverse wave traveling wave tube amplifier including an electron gun for providing an electron stream directed along a predetermined path; a flattened helix slow wave structure including an axially elongated inner conductor spaced from one of the flattened sides of said helix and being disposed contiguously to said path whereby said stream passes between said inner-conductor and said one of said sides in electromagnetic transverse field energy exchange relationship with said slow wave structure, said electron gun including a photo and thermionic emissive cathode having a transverse dimension in the direction between the flattened sides of said helical slow wave structure for emitting a transversely, spacially modulated electron current responsive to the magnitude of light energy incident upon photo emissive increments thereon and to the temperature to which said cathode is heated; electrical heater means thermally coupled to said cathode; and optical dispersing means for coupling an input light beam to different ones of said cathode increments in a pattern along said transverse direction depending upon the frequency composition of said input light beam.

5. A traveling wave tube frequency modulation optical receiver comprising: a transverse wave traveling wave tube amplifier including an electron gun for providing an electron stream directed along a predetermined path; a flattened helix slow wave structure including an inner-conductor spaced from one of the flattened sides of said helix and being disposed contiguously to said path whereby said stream passes between said inner-conductor and said one of said sides in electromagnetic energy transverse wave exchange relationship with said slow wave structure, said electron gun including a photo emissive cathode having a transverse dimension in the direction between the flattened sides of said helical slow wave structure for emitting a transversely, spacially modulated electron current responsive to the magnitude of light energy incident upon different increments thereon; and optical dispersing means for coupling an input light beam to said cathode in a spectral pattern thereon along said transverse direction.

6. A frequency modulation light signal receiver and amplifier system comprising: a photocathode having a photoemissive surface with a width dimension disposed transversely to a predetermined axis for emitting an electron stream therealong; optical dispersing means interposed in the path of the received beam for impressing different frequency components thereof on said photoemissive surface at different displacements thereon along said width of dimension; synchronous transverse wave parametric amplifier means disposed about said axis contiguously to said electron stream; and transverse wave decoupler means disposed about said stream for removing the amplifier signal therefrom.

7. The invention according to claim 6 in which said synchronous transverse wave parametric amplifier means includes a direct current energized quadrupole pump.

8. In a frequency modulation optical receiving system for receiving and demodulating a light signal beam, a microwave electron tube having a photocathode with a contiguous distribution of photoemissive increments over its emissive surface for generating an electron stream having a transverse intensity profile dependent upon the instantaneous intensity of light energy impingent upon said increments of the photoemissive surface of said cathode along the direction of the taking of said transverse intensity profile, a Michelson echelon optical dispersing means interposed in the path of said light signal beam and optically coupled to said photoemissive surface in a manner to impress the intensity of said beam thereon in a pattern along said direction in accordance with the frequency composition of said light signal beam, and transverse wave microwave coupling means disposed in transverse wave electromagnetic energy exchange relationship with said electron stream.

References Cited by the Examiner

UNITED STATES PATENTS

| | | | |
|---|---|---|---|
| 2,721,259 | 10/1955 | Krasno | 250—199 |
| 3,059,138 | 10/1962 | Wade | 330—4.7 |
| 3,154,748 | 10/1964 | Javan et al. | 250—199 X |

OTHER REFERENCES

Jenkins et al.: Fundamentals of Optics, 2nd ed., McGraw-Hill, 1950, pp. 343–345.

Ahlstrom et al.: Review of Scientific Instruments, July 1959, pp. 592–593.

Turner: Proc. I.R.E., May 1960, pp. 890–897.

Vogel et al.: Electronics, vol. 34, Nov. 10, 1961, pp. 81–85.

McMurty et al.: Applied Optics, vol. 1, No. 1, January 1962, pp. 51–53.

DAVID G. REDINBAUGH, *Primary Examiner.*